(12) United States Patent
Tang et al.

(10) Patent No.: US 10,573,864 B2
(45) Date of Patent: Feb. 25, 2020

(54) BATTERY CELLS FOR BATTERY PACKS IN ELECTRIC VEHICLES

(71) Applicant: SF Motors, Inc., Santa Clara, CA (US)

(72) Inventors: Yifan Tang, Santa Clara, CA (US); Chien-Fan Chen, Santa Clara, CA (US); Ying Liu, Santa Clara, CA (US); Derek Nathan Wong, Santa Clara, CA (US)

(73) Assignees: CHONGQING JINKANG NEW ENERGY VEHICLE CO., LTD., Chongqing (CN); SF MOTORS, INC., Santa Clara, CA (US)

( * ) Notice: Subject to any disclaimer, the term of this patent is extended or adjusted under 35 U.S.C. 154(b) by 0 days.

(21) Appl. No.: 15/994,339

(22) Filed: May 31, 2018

(65) Prior Publication Data

US 2019/0296296 A1    Sep. 26, 2019

Related U.S. Application Data

(60) Provisional application No. 62/647,327, filed on Mar. 23, 2018.

(51) Int. Cl.
| | |
|---|---|
| *H01M 10/60* | (2014.01) |
| *H01M 2/10* | (2006.01) |
| *H01M 2/04* | (2006.01) |
| *H01M 10/0525* | (2010.01) |
| *H01M 2/02* | (2006.01) |

(52) U.S. Cl.
CPC ....... *H01M 2/1083* (2013.01); *H01M 2/0267* (2013.01); *H01M 2/04* (2013.01); *H01M 2/1077* (2013.01); *H01M 10/0525* (2013.01)

(58) Field of Classification Search
CPC .... H01M 2/1083; H01M 2/04; H01M 2/1077; H01M 2/0267; H01M 10/0525
See application file for complete search history.

(56) References Cited

U.S. PATENT DOCUMENTS

2015/0023392 A1*   1/2015   Noh .......................... G01K 7/22
374/185

* cited by examiner

*Primary Examiner* — Cynthia K Walls
(74) *Attorney, Agent, or Firm* — Foley & Lardner LLP; James De Vellis

(57) ABSTRACT

Provided herein are battery cells for battery packs in electric vehicles. The battery cell includes a housing defining an inner region, an electrolyte disposed within the inner region, and a gasket that couples a lid with the housing to seal the battery cell. The gasket can include an inner portion having an ingress point and an egress point. The inner portion can have disposed therein a thermocouple wire that extends through the inner portion, past the ingress point and past the egress point. The thermocouple wire can include a first lead, a second lead, and a third lead. The first, second, and third leads can be disposed within a common jacket between the ingress point and the egress point. A thermocouple sensor can be disposed in the inner region and be coupled with the first, second, and third leads of the thermocouple wire to provide sensed temperature information.

20 Claims, 7 Drawing Sheets

BATTERY CELLS FOR BATTERY PACKS IN ELECTRIC VEHICLES

RELATED APPLICATION

The present application claims the benefit of priority under 35 U.S.C. § 119(e) to U.S. Provisional Application 62/647,327, filed on Mar. 23, 2018, titled "BATTERY CELL FOR ELECTRIC VEHICLE BATTERY PACK," which is incorporated herein by reference in its entirety.

BACKGROUND

Batteries can include electrochemical materials to supply electrical power to various electrical components connected thereto. Such batteries can provide electrical energy to various electrical systems.

SUMMARY

The present disclosure is directed to batteries cells for battery packs in electrical vehicles. The disclosed battery cell can include one or more thermocouple sensors disposed within an inner region of the housing of the battery cell to provide temperature data. The thermocouple sensors can be coupled with a thermocouple sensor wire having one or more leads that are embedded within an inner portion of a gasket that seals a lid with the housing. The thermocouple sensor wire can be disposed within the inner portion of the gasket such that a seal of the battery cell is maintained and temperature data can be provided to temperature devices or instruments external to the battery cell. For example, the one or more leads can be merged together within a common jacket that runs through the inner portion of the gasket such that the thermocouple wire extends past an ingress point and an egress point of the gasket. The thermocouple sensor wire can couple with the thermocouple sensor to provide temperature data to thermocouple devices external to the battery cell. Thus, the disclosed battery cell can provide temperature data while maintaining a seal of the respective battery cell.

At least one aspect is directed to a battery cell of a battery pack to power an electric vehicle. The battery cell includes a housing defining an inner region, an electrolyte disposed within the inner region of the housing, a lid and a gasket that couples the lid with the housing to seal the battery cell. The gasket can include an inner portion having an ingress point and an egress point. The inner portion can have disposed therein a thermocouple wire that extends through the inner portion, past the ingress point and past the egress point. The thermocouple wire can include a first lead having a first length, a second lead having a second length, and a third lead having a third length. The second length can be greater than the first length and the third length can be greater than the second length. Each of the first lead, the second lead and the third lead can be disposed within a common jacket between the ingress point and the egress point of the gasket.

At least one aspect is directed to a method of providing battery cells for battery packs of electric vehicles. The method includes providing a housing defining an inner region that houses an electrolyte, providing a lid, and coupling the lid with the housing to seal the battery cell using a gasket. The gasket can include an inner portion having an ingress point and an egress point. The method further includes disposing a thermocouple wire within the inner portion such that the thermocouple wire extends through the inner portion, past the ingress point and past the egress point. The thermocouple wire can include a first lead having a first length, a second lead having a second length, and a third lead having a third length. The second length can be greater than the first length and the third length can be greater than the second length.

At least one aspect is directed to a method of providing battery cells for battery packs of electric vehicles. The battery cell includes a housing defining an inner region, an electrolyte disposed within the inner region, a lid, and a gasket that couples the lid with the housing to seal the battery cell. The gasket can include an inner portion having an ingress point and an egress point. The inner portion can have disposed therein a thermocouple wire that extends through the inner portion, past the ingress point and past the egress point.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

Figure 1:
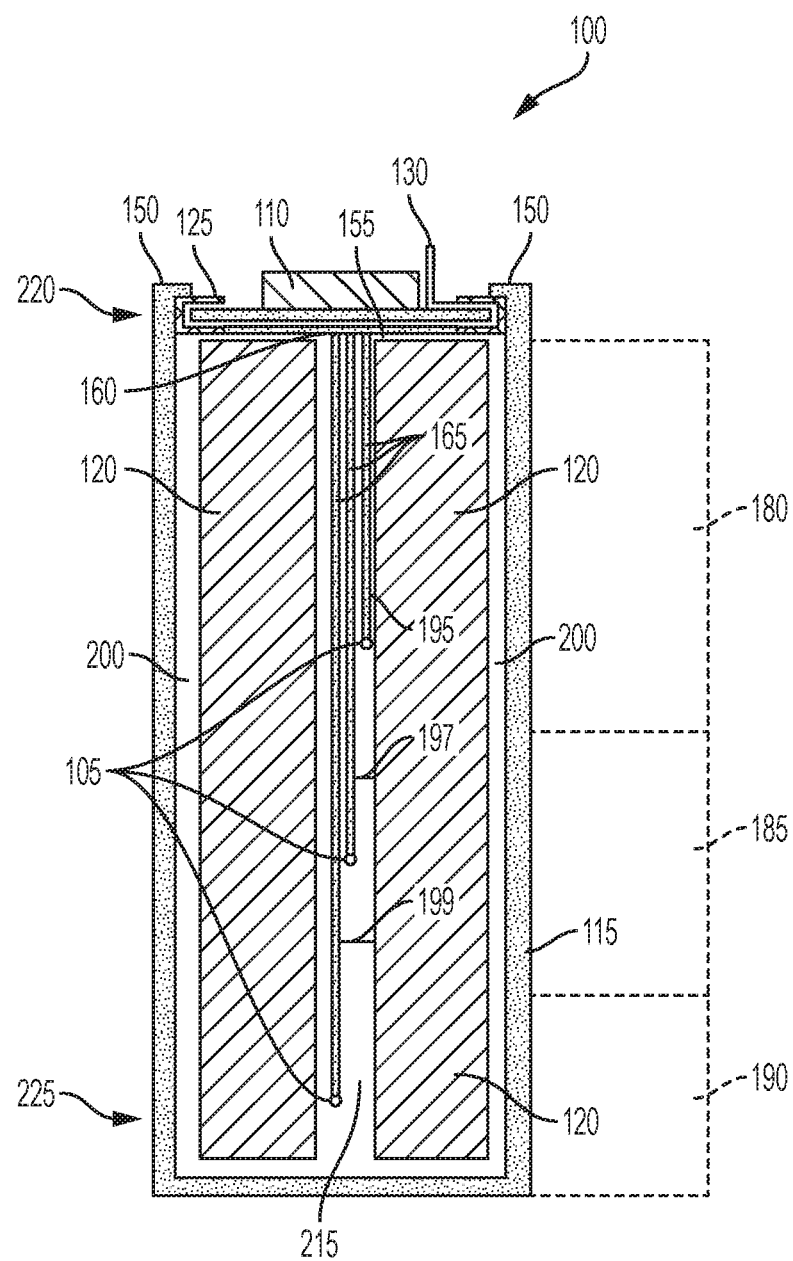
FIG. 1 is a block diagram depicting a cross-sectional view of an example battery cell for a battery pack in an electric vehicle.

Following below are more detailed descriptions of various concepts related to, and implementations of, methods, apparatuses, and systems of providing battery cells for battery packs of electric vehicles. The various concepts introduced above and discussed in greater detail below may be implemented in any of numerous ways, as the described concepts are not limited to any particular manner of implementation.

DETAILED DESCRIPTION

Following below are more detailed descriptions of various concepts related to, and implementations of battery cells for battery packs in electric vehicles. The various concepts introduced above and discussed in greater detail below can be implemented in any of numerous ways.

Described herein are battery cells for battery packs in electric vehicles ("EV's") for an automotive configuration. The automotive configuration can include network of electrical, electronic, mechanical or electromechanical devices within a vehicle of any type. The automotive configuration can include battery cells for battery packs in EV's. EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned. Battery packs, which can also be referred to herein as battery modules, that include a plurality of individual battery cells can include a wire bond to form respective electrical connections between the individual positive and negative terminals of the battery cells of the battery pack and positive or negative busbars or current collectors.

One architecture of a cylindrical lithium ion (or other type of) battery cell can include a deep-drawn metal cylinder casing and a protective cap at the top end. The protective cap can include devices to guard against fires and explosions. Electrical current can flow from an anode housed within the casing to an anode tab and then through the casing itself via a bonded wire connection. The casing of the battery cell can operate as the negative terminal, for example. The positive terminal of the battery cell can be on a lateral (e.g., top) end of the structure, and can include a lid. The lid can include a current interrupt device (CID), a rupture disk, and a gasket. The lid can reside within the gasket. The sealing element can insulate the positive terminal from the negative terminal of the battery cell.

The battery cells can include one or more thermocouple sensors disposed within an inner region of a housing of the battery cell to provide temperature data and temperature readings. The thermocouple sensor can be coupled with a thermocouple sensor wire having one or more leads embedded within an inner portion of a gasket that couples a lid with the housing of the battery cell.

For example, to measure temperature within the battery cells, a hole can be drilled or otherwise created through the lid or housing of the battery cell to provide a pathway for a wire to couple the thermocouple sensor with an external sensor and obtain readings from the thermocouple sensor. The lid can include a current interrupter device, such as notches or score marks that can rupture or open in the event of an out of tolerance range high pressure condition. When the hole is formed through the lid (which can also be referred to herein as a cap), the hole can impact the functionality of a current interrupter device (CID) or vent of the battery cell such that the CID or vent do not function properly. For example, the hole with thermocouple sensor wire disposed therein may fail at a pressure level that is below the threshold tolerance pressure level of the CID. In this example the battery cell may fail or rupture during in-tolerance pressure conditions where the battery cell should function normally. The hole formed through the housing of the battery cell can increase the risk of electrically shorting the battery cell. Further, the hole may increase the risk of electroleakage from the battery cell and, for example, the electrolyte may evaporate during the process of forming the hole until the hole is resealed.

The battery cell can alleviate the problems associated with the thermocouple sensor by embedding the thermocouple sensor wire within an inner portion (e.g., interior surface) of a gasket that couples the lid with the housing or can of the battery cells. The embedding of the thermocouple sensor wire can provide the thermocouple sensor within the battery cell without damaging or otherwise reducing the functionality of different components of the battery cell. For example, the thermocouple sensor can be disposed in an inner region of the battery cell and the thermocouple sensor wire can include one or more leads that extend out an exit point of a common jacket to couple with the thermocouple sensor within the battery cell without forming a hole in one or more portions of the battery cell (such as the can or housing). Thus, the seal of the battery cell can be maintained and the components, such as the CID or vent, do not lose functionality.

FIG. 1 depicts is a cross-sectional view of a battery cell 100 for a battery pack in an electric vehicle. The battery cell 100 can include a lithium-air battery cell, a lithium ion battery cell, a nickel-zinc battery cell, a zinc-bromine battery cell, a zinc-cerium battery cell, a sodium-sulfur battery cell, a molten salt battery cell, a nickel-cadmium battery cell, or a nickel-metal hydride battery cell, among others. The battery cell 100 can include a housing 115. The housing 115 can be contained in a battery pack (e.g., a battery array or battery module) installed a chassis of an electric vehicle. The housing 115 can have the shape of a cylindrical casing or cylindrical cell with a circular, ovular, or elliptical base, as depicted in the example of the battery cell of FIG. 1. A height of the housing 115 can be greater than a diameter of the housing 115. For example, the housing 115 can have a length (or height) of about 65 mm to about 75 mm and a maximum width (or diameter for circular examples) of about 17 mm to about 25 mm. The width or diameter of the housing 115 can be greater than the length (e.g., height) of the housing 115. The housing 115 can be formed from a prismatic casing with a polygonal base, such as a triangle, square, a rectangular, a pentagon, or a hexagon, for example. A height of such a prismatic cell housing 115 can be less than a length or a width of the base of the housing 115.

The housing 115 of the battery cell 100 can include at least one electrically or thermally conductive material, or combinations thereof. The electrically conductive material can also be a thermally conductive material. The electrically conductive material for the housing 115 of the battery cell 100 can include a metallic material, such as aluminum, an aluminum alloy with copper, silicon, tin, magnesium, manganese or zinc (e.g., of the aluminum 4000 or 5000 series), iron, an iron-carbon alloy (e.g., steel), silver, nickel, copper, and a copper alloy, among others. The electrically conductive material and thermally conductive material for the housing 115 of the battery cell 100 can include a conductive polymer. To evacuate heat from inside the battery cell 100, the housing 115 can be thermally coupled to a thermoelectric heat pump (e.g., a cooling plate) via an electrically insulating layer. The housing 115 can include an electrically insulating material. The electrically insulating material can be a thermally conductive material. The electrically insulating and thermally conductive material for the housing 115 of the battery cell 100 can include a ceramic material (e.g., silicon nitride, silicon carbide, titanium carbide, zirconium dioxide, beryllium oxide, and among others) and a thermoplastic material (e.g., polyethylene, polypropylene, polystyrene, or polyvinyl chloride), among others. To evacuate heat from inside the battery cell 100, the housing 115 can be thermally coupled to a thermoelectric heat pump (e.g., a cooling plate). The housing 115 can be directly thermally coupled to the thermoelectric heat pump without an addition of an intermediary electrically insulating layer.

The housing 115 of the battery cell 100 can include a first end 220 (e.g., top portion) and a second end 225 (e.g., bottom portion). The housing 115 can define an inner region 215 between the first end 220 and the second end 225. For example, the inner region 215 may include an interior of the housing 115. The first end 220, inner region 215, and the second end 225 can be defined along one axis of the housing 115. For example, the inner region 215 can have a width (or diameter for circular examples) of about 2 mm to about 6 mm and a length (or height) of about 50 mm to about 70 mm.

In the example depicted in FIG. 1, among others, the first end 220, inner region 215, and second end 225 can be defined along a vertical (or longitudinal) axis of cylindrical casing forming the housing 115. The first end 220 at one end of the housing 115 (e.g., a top portion as depicted in FIG. 1). The second end 225 can be at an opposite end of the housing 115 (e.g., a bottom portion as depicted in FIG. 1). The end of the second end 225 can encapsulate or cover the corresponding end of the housing 115.

One or more electrolytes 120 (also referred to as a jelly-roll) are disposed in the inner region 215 of the housing 115. The electrolyte 120 can include a negative electronic charge region or terminus and a positive electronic charge region or terminus. At least one negative tab can couple the electrolyte 120 (e.g., negative region of electrolytes 120) with the surface of the housing 115 or the negative lid portion of the lid 110. For example, a negative tab can couple the electrolyte 120 with an interior surface of the first end 220 of the housing 115, an interior surface of the second end 225 of the housing 115 or an interior surface of any portion of the housing 115 between the first end 220 and the second end 225.

The electrolyte 120 can include any electrically conductive solution, dissociating into ions (e.g., cations and anions). For a lithium-ion battery cell, for example, the electrolyte 120 can include a liquid electrolyte, such as lithium bisoxalatoborate ($LiBC_4O_8$ or LiBOB salt), lithium perchlorate ($LiClO_4$), lithium hexaflourophosphate ($LiPF_6$), and lithium trifluoromethanesulfonate ($LiCF_3SO_3$). The electrolyte 120 can include a polymer electrolyte, such as polyethylene oxide (PEO), polyacrylonitrile (PAN), poly (methyl methacrylate) (PMMA) (also referred to as acrylic glass), or polyvinylidene fluoride (PVdF). The electrolyte 120 can include a solid-state electrolyte, such as lithium sulfide ($Li_2S$), magnesium, sodium, and ceramic materials (e.g., beta-alumna).

Multiple electrolytes 120 (e.g., two electrolytes, more than two electrolytes) may be disposed within inner region 215 of the housing 115. For example, and as depicted in FIG. 1, two electrolytes 120 are disposed within inner region 215 of the housing 115. The number of electrolytes 120 can vary and can be selected based at least in part on a particular application of the battery cell 100.

Figure 4:
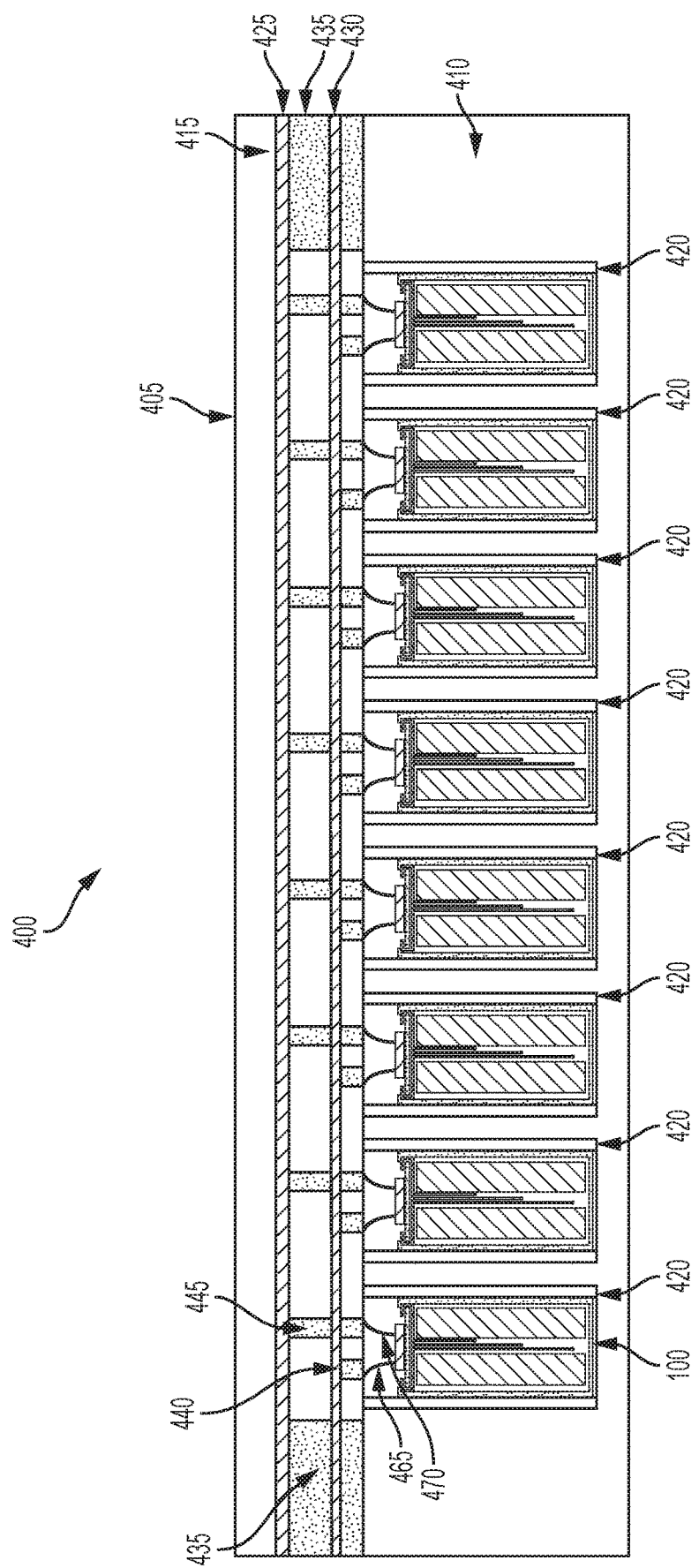
FIG. 4 is a block diagram depicting a cross-sectional view of an example battery pack for holding battery cells in an electric vehicle.

A lid 110 is disposed proximate to the first end 220 of the housing 115. The lid 110 can include a current interrupter device (e.g., CID). The lid 110 can be disposed onto the first lateral end 220 of the housing 115. The lid 110 can include a negative portion and a positive portion. For example, the negative lid portion can operate as the negative terminal of the battery cell 100 and the positive lid portion can operate as the positive terminal of the battery. The battery cell 100 can coupled with positive and negative current collectors of a battery module of an electric vehicle through the positive lid portion and the negative lid portion of the lid 110 (as illustrated in FIG. 4). For example, via a module tab connection (or other techniques such as wire bonding), the positive lid portion and the negative lid portion of the lid can couple the battery cell 100 with current collectors of the battery module from the lateral ends (e.g., top or bottom) or from longitudinal sides of the battery cell 100. One or more battery modules can form a battery pack disposed in an electric vehicle to power a drive train of the electric vehicle.

The lid 110 can be coupled with the electrolyte 120 through one or more tabs. For example, a negative tab can couple the electrolyte 120 with the negative lid portion of the lid 110. When the negative lid portion of the lid 110 is coupled with the electrolyte 120 through the negative tab, the housing 115 may include non-conductive material. A positive tab can couple the electrolyte 120 (e.g., positive region of electrolytes 120) with the positive lid portion of the lid 110.

An insulator layer 200 can separate or electrically isolate the positive lid portion from the negative lid portion. The insulation layer 200 may be optional. An insulation layer 200 may be disposed between an inner surface of the housing 115 and the one or more electrolytes 120. An insulation layer 200 may be disposed between the lid 110 and the one or more electrolytes 120. The insulation layer 200 may include any electrically insulative material and be configured to withstand a corrosive environment within the housing 115, such as but not limited to, dielectric materials or materials formed from blends of polypropylene.

A gasket 125 (e.g., sealing element) can couple the lid 110 with the first end 220 of the housing 115. The gasket 125 can house, retain, hold, secure, seal, or otherwise include the lid 110. The gasket 125 can include a gasket, a washer, an O-ring, a cap, a fitting, a hose coupling, or any other component to house, retain, hold, secure, or seal the lid 110 with the housing 115.

The gasket 125 can couple with the lid 110 to secure or hold the lid 110 in place and seal the battery cell 100. The seal can include a hermetic or other seal sufficient to prevent leakage of the electrolyte 120. For example, the gasket 125 can form the seal across the first end 220 of the housing 115 using the lid 110. The seal formed by the gasket 125 can include any type of mechanical seal, such as a hermetic seal, an induction seal, a hydrostatic seal, a hydrodynamic seal, and a bonded seal, among others. The gasket 125 can include polymer material or electrically insulating material to electrically isolate portions of the lid 110 (e.g., negative lid portion, positive lid portion) from the housing 115. The gasket 125 can include thermally conductive material to allow heat to evacuate from the inner region 215.

The gasket 125 can couple with the edge or side portion of the lid 110 to secure the lid 110 to the housing 115. The gasket 125 can be positioned on, adjacent or proximate to (e.g., within 1 mm of) or be at least partially supported by an inner surface of the housing 115. For example, the inner surface may be in contact with the gasket 125 or the inner surface may include an indentation that is in contact with the gasket 115 to support the gasket 125 and seal the battery cell 100. The gasket 125 can be held in place by inserting an indentation into the battery cell housing 100 wall at a predetermined distance (e.g., 2.5 mm to 6 mm) below the surface of the crimped surface 150 around the entire circumference of the housing 115. The crimp 150 can create a compressive seal between it and the surface created by the indentation holding the lid 110 and the gasket 125 in place. The battery cell 100 may include multiple gaskets 125 disposed to couple the lid 110 with the first end 220 of the housing 115.

The gaskets 125 can be positioned within the housing 115 such that the lid 110 is disposed over the electrolytes 120. When, for example the battery cell 100 includes two lids 110, e.g., one lid for a positive terminal and one lid for a negative terminal disposed at a same lateral edge of the battery cell 100 (e.g., the top), the battery cell 100 can include two gaskets 125, one for each lid or terminal.

Gasket 125 includes an inner portion 135 in the interior of the gasket 125. The inner portion 135 can include a tunnel, an opening, passageway, pathway, conduit, hollow interior, or cannula that extends through an interior of the gasket 125 from an ingress area or point 140 to an egress area or point 145. The inner portion 135 can include a polymer material or insulating material, such as but not limited to a dielectric material. The inner portion 135 can be integrally formed within the gasket 125. An outer diameters or width of the gasket 125 can be formed such that it is similar to the outer diameter or width of the housing 115. For example, the gasket 125 can have an outer diameter or width in a range from about 15 mm to about 25 mm and a thickness (e.g., distance between the inner diameter and outer diameter of the gasket 125) in a range from about 0.2 mm to about 1 mm. The overhang of the gasket 125 can be formed to extend to cover the lid 110 by a range of about 1 mm to about 3.5 mm on a top surface of the lid 110 and a bottom surface of the lid 110.

The holes formed by the ingress 140 and the egress 145 can be formed to have a similar or substantially the same diameter as the diameter of the wire 130 such that the wire 130 effectively forms a seal at the ingress 140 and the egress 145 when the wire 130 is inserted through both. For example, the ingress 140 and the egress 145 can have a diameter in a range from about 0.1 mm to about 0.8 mm.

The ingress point 140 can be disposed within the battery cell 100 (e.g., between the lid 110 and the electrolyte 120 and enclosed in the battery cell 100). The egress point 145 can be exposed, outside, or external to the battery cell 100 (e.g., between an outer or top surface of the lid 110 and a crimped edge 150 of the housing 115). The crimped edge 150 (or crimped portion) can assist in holding the gasket 125 in place. The crimped edge 150 can also operate as a negative terminal, for example with the lid 110 operating as the positive terminal. The crimped edge 150 will be discussed in greater detail below.

The ingress point 140 and the egress point 145 can be sealed with at least one thermocouple wire 130 disposed in the tunnel 135. The seals can be fluid tight or hermetic, for example. In addition to the thermocouple wire 130, the inner portion 135 can include insulating, sealing, or potting material to electrically isolate the thermocouple wire 130 from the gasket 125 or to maintain at least a segment of the thermocouple wire 130 in a fixed position within the tunnel 135.

The housing 115 can include one or more crimped edges 150 to house, retain, hold, secure, or seal the gasket 125 to the first end 220 of the housing 115. For example, the first lateral end 220 of the housing 115 can include one or more crimped edges 150 that can be formed such that the respective crimped edges 150 bend over (or are crimped over) the gasket 125 to secure the gasket 125 and seal the battery cell 100. The crimped edges 150 of the first end 220 of the housing 115 can fold, pinch, bend towards, or engage with the gasket 125. The crimped edges 150 can be disposed about at least one side of the gasket 125 to hold the gasket 125 in place, for example to hold the gasket 125 in position against a surface (e.g., top surface) of the electrolyte 110 or an insulation layer 200 disposed between the gasket 125 and the electrolyte 120 and seal the battery cell 100. The seal can include a hermetic or fluid resistant seal so that the electrolyte or jelly roll 120 does not leak from its location within the housing 115. The lid 110 can be spaced a distance from the electrolyte 120 with the distance corresponding to a thickness of a portion of the gasket 125. The crimped edges 150 can have a length from its respective outer diameter to its respective inner diameters in a range of about 1 mm to about 3 mm and can span or cover portions of the gasket 125 in a range of 360 degrees. The thickness or length from the outer diameter to the inner diameter of the crimped edges 150 can be formed to be similar or the same as the thickness of the housing 115 (e.g., about 0.15 mm to about 0.35 mm).

One or more thermocouple sensors (also referred to herein as thermal couple sensors) 105 can be disposed within the inner region 215 of the housing 115. The thermocouple sensors 105 can be coupled with one or more thermocouple wires 130 (also referred to herein as thermocouple sensor wires). The thermocouple wire 130 can include conductive material, metal material or metallic material.

The thermocouple wire 130 can include one or more leads 165 that extend past the egress point 145 and the past the ingress point 140 of the gasket 125. The leads 165 of the thermocouple wire 130 may extend out the egress point 145 at a variety of different lengths, including but not limited to 1 meter. For example, the thermocouple wire 130 can couple the thermocouple sensors 105 with a thermocouple device that can include a data processing system to obtain or interpret sensed temperature information from the thermocouple sensor 105, and that can output a temperature reading, for example. The thermocouple wire 130 can include one or more leads 165 that extend past the egress point 145 to couple with the respective thermocouple device.

There can be more than one thermocouple wire 130 disposed in the inner region 215. For example, there can be three (or other number of) thermocouple wires 130 within the inner region 215 of the housing 115, which can be separate wires or segments of a common wire, and referred to herein as leads 165. The leads 165 of the thermocouple wire 130 can be merged, twisted or otherwise combined together in a common jacket 155 (e.g., in a common or communal wire jacket or insulator) for passage through an inner portion 135 of the gasket 125. For example, the leads 165 can be disposed within the common jacket and include an insulation material disposed around or between each of the multiple leads 165. The common jacket 155 (or outer sheath) may include an insulating material, a plastic material, thermoplastic material, a rubber material, a Polyvinyl chloride (PVC) material, or other material to protect the thermocouple wire 130 or leads 165 from mechanical, moisture or chemical issues.

As depicted in FIG. 1, among others, multiple thermocouple sensors 105 can be disposed at different locations within the housing 115. For example, the thermocouple sensors 105 can be evenly or symmetrically spaced along a length of the electrolyte 120. The thermocouple sensors 105 can also be disposed asymmetrically within the electrolyte 120 or clustered at an area of the electrolyte 120 that is determined or likely to be hottest the area of the battery cell 100. The thermocouple sensors 105 can be in contact with at least one electrolyte 120, adjacent, or proximate to (e.g., spaced within about 1 mm to about 2 mm of) at least one electrolyte 120. The battery cell 100 can include two (or other number of) electrolytes 120 or one electrolyte 120 having separate portions (e.g., to provide positive and negative charges). The battery cell 100 can include at least one thermocouple sensor 105 for each portion of the electrolyte 120. For example, for a battery cell having a length of about 65 to about 75 mm, the thermocouple wires 130 (or each segment thereof) can have a length of about 100 mm or less from the egress point 145 to the thermocouple sensor 105. The thermocouple wires 130 (or the thermocouple sensors 105) can be disposed between the housing 115 and the electrolyte 120 (e.g. adjacent or within about 1 mm to about 2 mm of an inner surface of the housing 115), or can be disposed surrounded by the electrolyte 120 (e.g., in the interior of the area defined by the housing as in the example of FIG. 1).

In a battery cell 100 having multiple thermocouple sensors 105, each of the thermocouple sensors 105 can be disposed proximate to, adjacent to, or near different regions of the electrolyte 120 or different regions of the inner region 215 of the housing 115. For example, and as depicted in FIG. 1, a first thermocouple sensor 105 can be disposed adjacent to a first portion 180 of the electrolyte 120 and in a first region 180 of the inner region 215 of the housing 115. A second thermocouple sensor 105 can be disposed adjacent to a second portion 185 of the electrolyte 120 and in a second region 185 of the inner region 215 of the housing 115. A third thermocouple sensor 105 can be disposed adjacent to a third portion 190 of the electrolyte 120 and in a first region 190 of the inner region 215 of the housing 115. The first portion 180, second portion 185, and the third portion 190 can be different. Thus, the different thermocouple sensors 105 disposed at different regions within the inner region 215 of the housing 115 can sense temperature properties of different portions of the electrolyte 120.

In a battery cell 100 having one thermocouple sensor 105, the single thermocouple sensor 105 can be disposed in the first portion 180 (e.g., top region), the second portion 185 (e.g., middle region) or the third portion 190 (e.g., bottom region) and sense a temperature within the housing 115.

Figure 2:
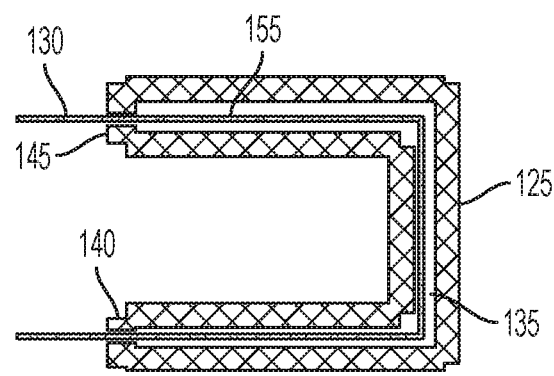
FIG. 2 is a block diagram depicting a cross-sectional view of an example of gasket of the battery cell of FIG. 1 having one or more thermocouple wires embedded within the gasket with the one or more thermocouple wires extending past the ingress and the egress of the gasket.

FIG. 2 depicts a cross-sectional view of at least one gasket 125 that illustrates the leads 165 of the thermocouple wire 130 disposed in the common jacket 155 within the inner portion 135 of the gasket 125. The gasket 125 can include the ingress point 140 (e.g., entry orifice) and the egress point 145 (e.g., exit orifice). The ingress point 140 can be disposed within the inner region 215 of the housing 115 such that it opens into the inner region 215 and the egress point 145 can be disposed outside the housing 115 such that it opens or is exposed to an environment outside the battery cell 100.

The leads 165 of the thermocouple wire 130 can be disposed within the common jacket 155 within the inner portion 135 of the gasket 125. The common jacket 155 can be embedded within the inner portion 135. For example, the common jacket 155 or one or more portions of the common jacket 155 can be integrally formed within the inner portion 135. The inner portion 135 may include a polymer material or dielectric material that is disposed about the common jacket 155 (e.g., formed around all sides of the common jacket to encase the common jacket in the inner portion 135) or one or more portions of the common jacket 155 such that the common jacket 155 or one or more portions of the common jacket 155 can form a single piece with the inner portion 135 of the gasket 125. The inner portion 135 can be configured to hold the common jacket 135, one or more portions of the common jacket 135 or one or more leads 165 of the thermocouple wire 130 in a fixed position. The cross section of the inner portion 135 (e.g., hollow portion) of the gasket 125 can be square or cylindrical in geometry and can have a length or diameter range of about 0.2 mm to about 0.8 mm.

One or more leads 165 of the thermocouple wire 130 may be disposed within or embedded within the inner portion 135 of the gasket 125. For example, the material forming the inner portion 135 (e.g., polymer material, dielectric material) can be formed around or disposed about the one or more leads 165 such that the one or more leads 165 or one or more portions of the one or more thermocouple wire 130 are integrally formed within the inner portion 135 of the gasket 125. The one or more leads 165 or one or more portions of the thermocouple wire 130 can form a single piece with the inner portion 135 of the gasket 125.

The leads 165 can extend out the egress point 145 of the gasket 125 to facilitate coupling with an external sensor or reading instrument and provide sensed temperature data from the thermocouple sensors 105 disposed within the gasket 125. The leads and the thermocouple wire 130 can extend out at a variety of different lengths or distances with the length or distance of one or more of the leads 165 or the thermocouple wire 130 can be selected based in part on a thermocouple device or instrument the respective leads 165 or thermocouple wire 130 is to be coupled with to provide the temperature data. For example, the leads 165 may extend out of the egress point 140 or an exit point 160 of the common jacket 155 at a length of about 1 meter.

The battery cell 100 can be disposed within a battery module or battery pack of an electric vehicle and the leads 165 or thermocouple wire 130 can couple with instruments or devices external to the battery cell but within the battery module, instruments or devices external to the battery module but within the electric vehicle, or instruments or devices external to the electric vehicle. Thus, the leads 165 or the thermocouple wire 130 can be have a length such that they are long enough to reach the appropriate instrument or device they are to be coupled with.

The leads 165 of the thermocouple wire 130 can extend out the ingress point 140 and into the inner region 215 of the housing 115 to couple with one or more thermocouple sensors 105 at a variety of different lengths. For example, the leads 165 may extend out of the ingress point 145 or an exit point 160 of the common jacket 155 at a length of 20 mm to 60 mm. The length of one or more of the leads 165 extends into the inner region 215 can be selected based in part on the thermocouple sensor 105 the respective lead 165 is to be coupled with and the location of the thermocouple sensor 105 within the inner region 215. For example, a first lead 165 can extend at a first distance from an exit point 160 of the common jacket 155 and disposed a first predetermined spacing (e.g., distance, gap) from a first portion 180 of the electrolyte 120. A second lead 165 can extend at a second distance from the exit point 160 of the common jacket 155 and disposed a second predetermined spacing (e.g., distance, gap) from a second portion 185 of the electrolyte 120. A third lead 165 can extend at a third distance from the exit point 160 of the common jacket 155 and disposed a third predetermined spacing (e.g., distance, gap) from a third portion 190 of the electrolyte 120. The second distance can be different from the first distance and the third distance can be different form the first distance and the second distance. The second predetermined spacing can be different from the first predetermined spacing and the third predetermined spacing can be different from the second predetermined spacing and the first predetermined spacing.

The first lead 165 can couple with a first thermocouple sensor 105 with the first thermocouple sensor 105 disposed proximate to, adjacent to the first portion 180 of the electrolyte 120. The second lead 165 can couple with a second thermocouple sensor 105 with the second thermocouple sensor 105 disposed proximate to, adjacent to the second portion 185 of the electrolyte 120. The third lead 165 can couple with a third thermocouple sensor 105 with the third thermocouple sensor 105 disposed proximate to, adjacent to the third portion 190 of the electrolyte 120. The first thermocouple sensor 105 can be spaced a first distance 195 from the electrolyte 120. The second thermocouple sensor 105 can be spaced a second distance 197 from the electrolyte 120. The third thermocouple sensor 105 can be spaced a third distance 199 from the electrolyte 120. The first distance 195 can be different from the second distance 197 and the third distance 199 and the second distance 197 can be different from the third distance 199.

The first distance 195, the second distance 197 and the third distance 199 can include a range of distances, including but not limited to about 0.25 mm to about 3 mm from a surface of one or more electrolytes 120 disposed within the inner region 215. For example, the first distance 195 can include a range from about 0.25 mm to about 0.5 mm from a surface of one or more electrolytes 120, the second distance 197 can include a range from about 1 mm to about 2 mm from a surface of one or more electrolytes 120, and the third distance can include a range from about 2 mm to about 3 mm from a surface of one or more electrolytes 120. Other distances outside these ranges are possible for the first distance 195, the second distance 197, and the third distance 199.

The first distance 195, the second distance 197 and the third distance 199 can be the same such that the first, second, and third thermocouple sensors 105 are disposed the same distance from the electrolyte 120 but adjacent to different portion 180, 185, 190 of the electrolyte 120. The second thermocouple sensor 105 can be spaced a first distance from the first thermocouple sensor 105 and the third thermocouple sensor 105 can be spaced a second distance from the second thermocouple sensor 105 such that each of the thermocouple sensors 105 are disposed at different regions of the inner region 215. The second distance can be different than the first distance.

Figure 3:
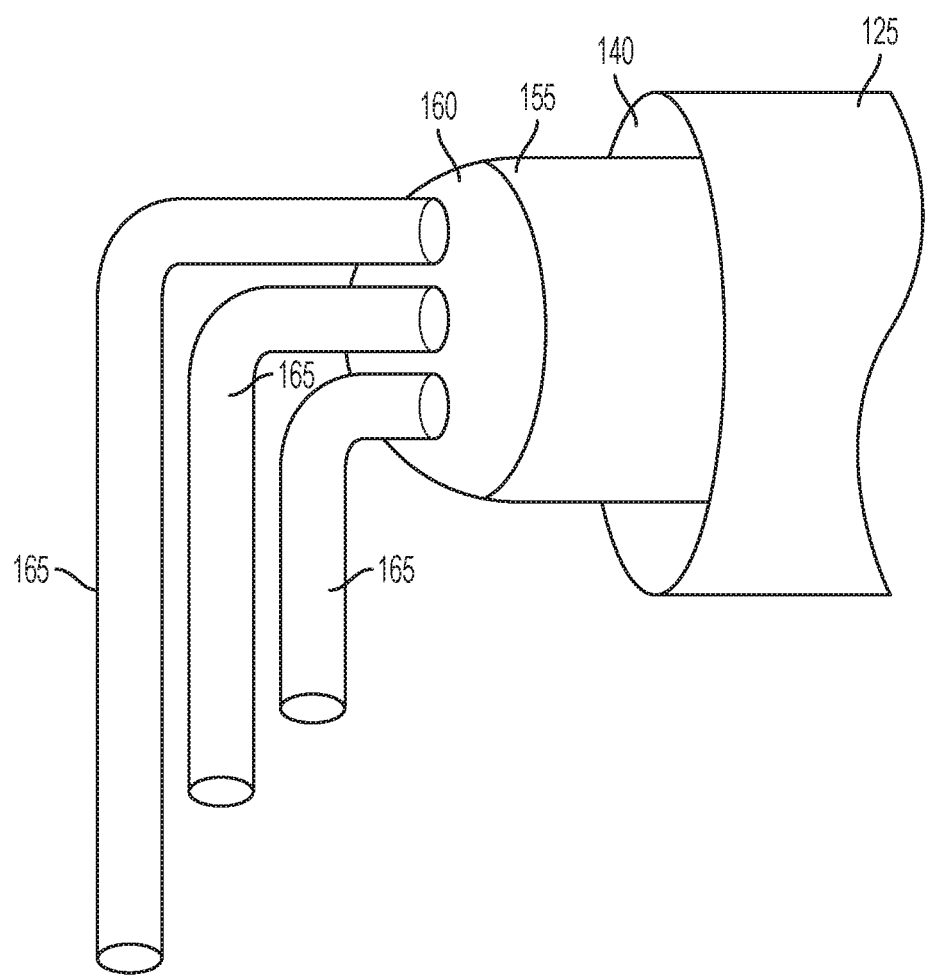
FIG. 3 is a block diagram depicting a cross-sectional view of an example of multiple thermocouple wires disposed within a common jacket within a gasket of the battery cell of FIG. 1.

FIG. 3 depicts a cross-sectional view of three leads 165 of the thermocouple wire 130 extending out of the exit point 160 of the common jacket 155. For example, the first lead 165, the second lead 165, and the third lead 165 can protrude or extend out of the exit point 160 and into the inner region 215 of the housing 115.

The common jacket 155 can protrude or extend out of the ingress point 140 of the gasket 125. The common jacket 155 can extend out of the ingress point 140 at a variety of different lengths and the particular length can be selected based in part on the dimensions of the gasket 125 or the dimensions of the housing 115. The common jacket 155 may be entirely embedded within the inner portion 135 of the gasket 125 and the leads 165 may extend out of the ingress point 140 of the gasket 125.

The leads 165 can be merged, twisted or otherwise combined within the common jacket 155. The leads 165 can in contact with each other within the common jacket 155. An insulation layer 200 may be disposed around or otherwise about each of the leads 165 such that the leads 165 are insulated from each other within the common jacket 155. The number of leads 165 in a batter cell 100 can vary. For example, a single lead 165 may be disposed within the common jacket 155 or a single lead 165 may be disposed within the inner portion 135 of the gasket 125 and couple with a single thermocouple sensor 105 disposed within the inner region 215 of the housing 115. Multiple leads 165 may be disposed within the common jacket 155 or multiple leads 165 may be disposed within the inner portion 135 of the gasket 125 and couple with multiple thermocouple sensors 105 disposed within the inner region 215 of the housing 115. The number of leads 165 can be selected based in part on the number of thermocouple sensors 105 disposed within a battery cell 100.

The leads 165 can extend out and hang freely into the inner region 215 of the housing 115 or the leads 165 can extend out from the exit point 160 and hang in a fixed or substantially fixed position into the inner region 215 of the housing 115.

The leads 165 can be spaced from each other within the inner region 215 such that they do not contact each other in the inner region 215. For example, the leads 165 can be spaced a distance from each other or spaced from one or more electrolytes 120 ranging from about 1 mm to about 2 mm. The spacing between the leads 165 can vary and can be selected based in part on the dimensions of the inner region 215. One or more of the leads 165 may be arranged such that they are in contact with each other or portions of the one or more leads 165 (e.g., portions overlap) are in contact with each other within the inner region 215.

An insulation layer 200 can be disposed between the leads 165 and one or more electrolytes 120. The insulation layer 200 may be disposed within the inner region 215 such that the insulation layer 200 is disposed between the leads 165 and thermocouple sensors 105 the leads 165 are coupled with and the electrolytes 120.

The leads can extend out of the exit point 160 and be disposed between an inner surface of the housing 115 and one or more of the electrolytes 120. For example, the leads 165 and the respective thermocouple sensors 105 coupled with the leads 165 can be disposed between the inner surface of the housing 115 and the electrolytes 120 such that the leads 165. An insulation layer 200 can be disposed between the leads 165 and the thermocouple sensors 105 to isolate the leads 165 and the thermocouple sensors 105 from the electrolytes 120.

The thermocouple wire 130 may include a single lead 165 or the thermocouple wire 130 may include multiple leads 165. The number of leads forming the thermocouple wire 130 can be selected based at least in part on a number of thermocouple sensors 105 disposed within a battery cell 100.

An insulation layer 200 can be disposed between the thermocouple wire 130 and the one or more electrolytes 120 disposed within the inner region 215 of the housing 115. An insulation layer 200 may be disposed between the leads 165 and the one or more electrolytes 120 disposed within the inner region 215 of the housing 115. An insulation layer 200 may be disposed between the thermocouple sensors 105 and the one or more electrolytes 120 disposed within the inner region 215 of the housing 115.

FIG. 4, depicts is a cross-section view 400 of a battery pack 405 to hold a plurality of battery cells 100 in an electric vehicle. The battery cells 100 can include one or more thermocouple sensors 105, each coupled with at least one lead 165 of a thermocouple sensor wire 130 that extends out the egress 145 of the gasket 125 of one or more of the battery cells 100 to provide temperature data.

The battery pack 405 can include a battery case 410 and a capping element 415. The battery case 410 can be separated from the capping element 415. The battery case 410 can include or define a plurality of holders 420. Each holder 420 can include or define a hollowing or a hollow portion defined by the battery case 410. Each holder 420 can house, contain, store, or hold a battery cell 100. The battery case 410 can include at least one electrically or thermally conductive material, or combinations thereof. The battery case 410 can include one or more thermoelectric heat pumps.

Each thermoelectric heat pump can be thermally coupled directly or indirectly to a battery cell 100 housed in the holder 420. Each thermoelectric heat pump can regulate temperature or heat radiating from the battery cell 100 housed in the holder 420. The first bonding element 465 and the second bonding element 470 can extend from the battery cell 100 through the respective holder 420 of the battery case 410.

Between the battery case 410 and the capping element 415, the battery pack 405 can include a first busbar 425, a second busbar 430, and an electrically insulating layer 435. The first busbar 425 and the second busbar 430 can each include an electrically conductive material to provide electrical power to other electrical components in the electric vehicle. The first busbar 425 (sometimes referred to as a first current collector) can be connected or otherwise electrically coupled to the first bonding element 465 extending from each battery cell 100 housed in the plurality of holders 420 via a bonding element 445. The bonding element 445 can be bonded, welded, connected, attached, or otherwise electrically coupled to the second bonding element 465 extending from the battery cell 100. The first bonding element 465 can define the first polarity terminal for the battery cell 100. The first busbar 425 can define the first polarity terminal for the battery pack 405. The second busbar 430 (sometimes referred to as a second current collector) can be connected or otherwise electrically coupled to the second bonding element 470 extending from each battery cell 100 housed in the plurality of holders 420 via a bonding element 440. The bonding element 540 can be bonded, welded, connected, attached, or otherwise electrically coupled to the second bonding element 470 extending from the battery cell 100. The second bonding element 470 can define the second polarity terminal for the battery cell 100. The second busbar 430 can define the second polarity terminal for the battery pack 405.

The first busbar 425 and the second busbar 430 can be separated from each other by the electrically insulating layer 435. The electrically insulating layer 435 can include spacing to pass or fit the first bonding element 465 connected to the first busbar 425 and the second bonding element 470 connected to the second busbar 430. The electrically insulating layer 435 can partially or fully span the volume defined by the battery case 510 and the capping element 415. A top plane of the electrically insulating layer 435 can be in contact or be flush with a bottom plane of the capping element 415. A bottom plane of the electrically insulating layer 435 can be in contact or be flush with a top plane of the battery case 410. The electrically insulating layer 435 can include any electrically insulating material or dielectric material, such as air, nitrogen, sulfur hexafluoride ($SF_6$), porcelain, glass, and plastic (e.g., polysiloxane), among others to separate the first busbar 425 from the second busbar 430.

Figure 5:
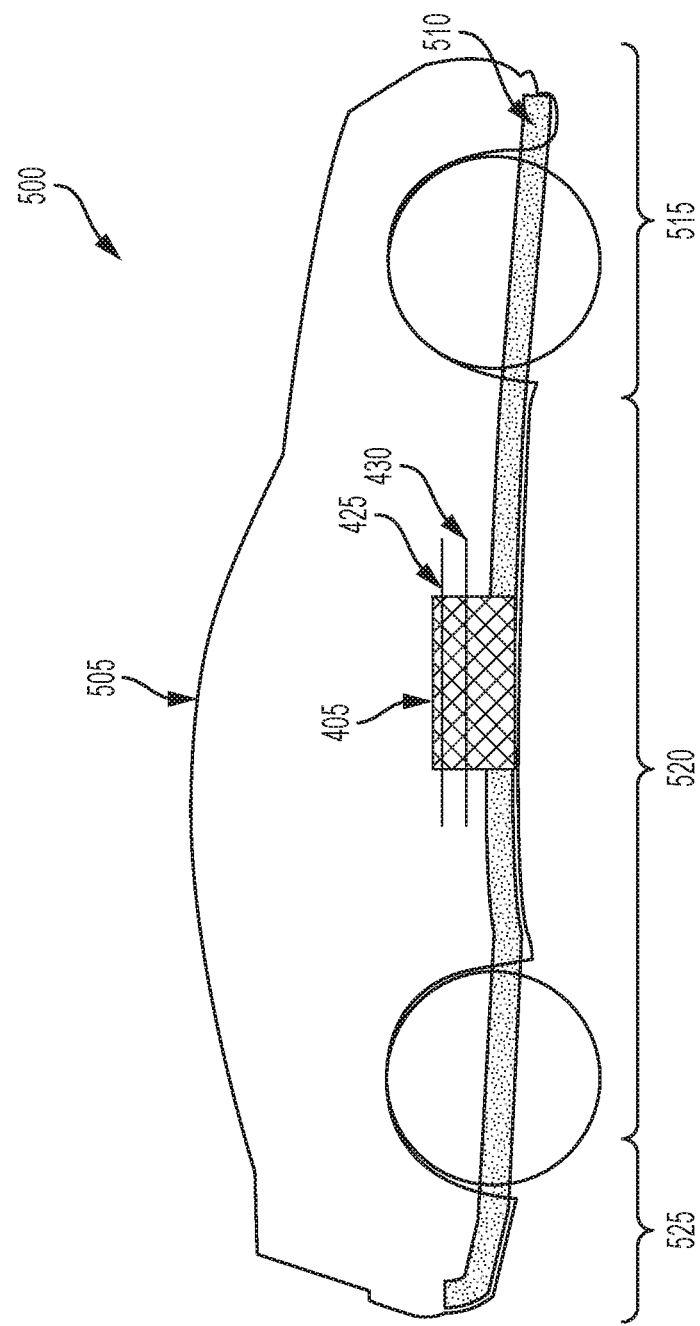
FIG. 5 is a block diagram depicting a cross-sectional view of an example electric vehicle installed with a battery pack.

FIG. 5 depicts a cross-section view 500 of an electric vehicle 505 installed with a battery pack 405. The electric vehicle 505 can include a chassis 510 (sometimes referred to as a frame, internal frame, or support structure). The chassis 510 can support various components of the electric vehicle 505. The chassis 510 can span a front portion 515 (sometimes referred to herein a hood or bonnet portion), a body portion 520, and a rear portion 525 (sometimes referred to herein as a trunk portion) of the electric vehicle 505. The front portion 515 can include the portion of the electric vehicle 505 from the front bumper to the front wheel well of the electric vehicle 505. The body portion 520 can include the portion of the electric vehicle 505 from the front wheel well to the back wheel well of the electric vehicle 505. The rear portion 525 can include the portion of the electric vehicle 505 from the back wheel well to the back bumper of the electric vehicle 505.

The battery pack 405 can be installed or placed within the electric vehicle 505. The battery pack 405 can be installed on the chassis 510 of the electric vehicle 505 within the front portion 515, the body portion 520 (as depicted in FIG. 5), or the rear portion 525. The first busbar 425 and the second busbar 430 can be physically connected or electrically coupled with other electrical components of the electric vehicle 505 to provide electrical power to the electric vehicle 505.

Figure 6:
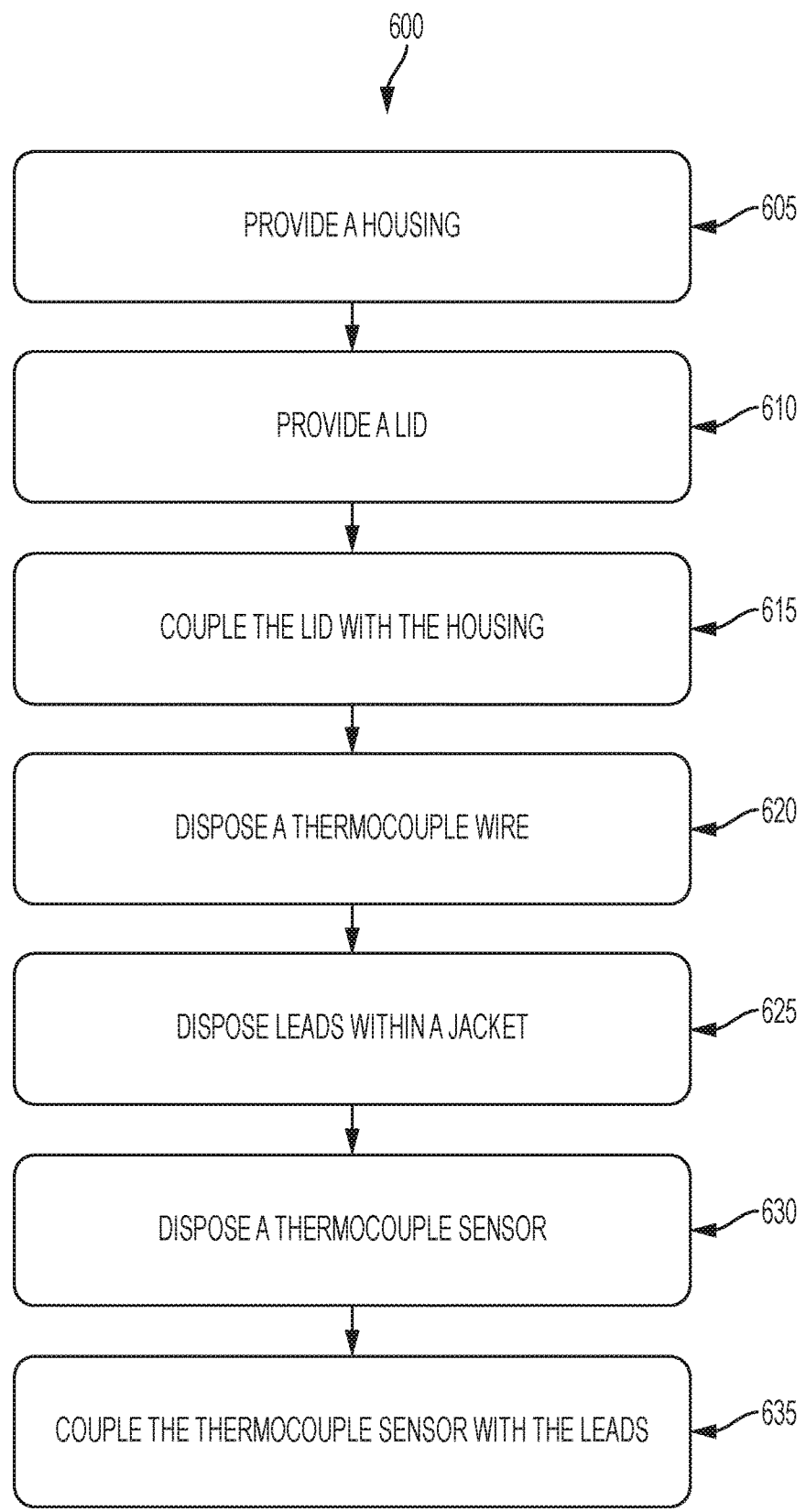
FIG. 6 is a flow diagram depicting a first example method of providing battery cells for battery packs for electric vehicles.

FIG. 6 depicts a method 600 of providing battery cells 100 for battery packs 405 of electric vehicles 505. The functionalities of the method 600 can be implemented or performed using the systems, apparatuses, or battery cells detailed herein in conjunction with FIGS. 1-5. The method 600 includes providing at least one housing (ACT 605). The housing can define an inner region that houses an electrolyte. The method 600 can include providing at least one lid (ACT 610). The method 600 can include coupling the lid with the housing (ACT 615). The lid can couple with the housing to seal the battery cell, for example, using a gasket with the gasket including an inner portion having an ingress point and an egress point. The method 600 can include disposing a thermocouple wire (ACT 620). For example, the thermocouple wire can be disposed within the inner portion such that the thermocouple wire extends through the inner portion, past the ingress point and past the egress point and the thermocouple wire including a first lead having a first length, a second lead having a second length, and a third lead having a third length with the second length greater than the first length, the third length greater than the second length. The method 600 can include disposing leads within at least one jacket (ACT 625). For example, each of the first lead, the second lead and the third lead can be disposed within a common jacket between the ingress point and the egress point of the gasket. The method 600 can include disposing at least one thermocouple sensor (ACT 630). The thermocouple sensor can be disposed in the inner region. The method 600 can include coupling the thermocouple sensor with the leads (ACT 635). The thermocouple sensor can be coupled with the first lead, the second lead and the third lead of the thermocouple wire to provide sensed temperature information through the thermocouple wire.

The method 600 provides a housing 115. The housing 115 can define an inner region 215 that houses an electrolyte 120 (ACT 605). The battery cell 100 can include a lithium ion battery cell, a nickel-cadmium battery cell, or a nickel-metal hydride battery cell. The battery cell 100 can be part of a battery pack 405 installed within a chassis 510 of an electric vehicle 505. The housing 115 can be formed from a cylindrical casing with a circular, ovular, or elliptical base or from a prismatic casing with a polygonal base. The housing 115 can include a first end 220 and a second end 225. The housing 115 can define an inner region 215 that is disposed between the first end 220 and the second end 225.

One or more electrolytes 120 can be disposed in the inner region 225 of the housing 115. The electrolyte 120 can be provided within the inner region 215 such that it is disposed between the first end 220 and the second end 225 of the housing 115. The battery cell 100 may include multiple electrolytes 120 with the multiple electrolytes 120 disposed proximate to or adjacent to each other and disposed between the first end 220 and the second end 225 of the housing 115.

At ACT 610, a lid 110 can be provided. The lid 110 can be provided or disposed proximate to, adjacent to the first end 220 of the housing 115. Once the electrolyte 120 is disposed within the inner region 215, the lid 110 can be disposed proximate to, adjacent to or coupled with the first end 220 of the housing 115. The lid 110 can be positioned such that a first surface (e.g., top surface) of the lid 110 is positioned distal from the electrolyte 120 and forming an exposed surface (e.g., top surface) of the battery cell 100 and a second surface (e.g., bottom surface) of the lid 110 is positioned proximate to, adjacent to or facing the electrolyte 120 within the inner region 215. For example, the lid 110 can be positioned over the electrolyte 120.

The lid 110 can include or be configured to operate as a current interrupter device. For example, the lid 110 can include a positive lid portion and a negative lid portion. The negative lid portion can operate as the negative terminal of the battery cell 100 and the positive lid portion can operate as the positive terminal of the battery cell 100. For example, via a module tab connection (or other techniques such as wire bonding), the positive lid portion and the negative lid portion of the lid can couple the battery cell 100 with current collectors of the battery module from the lateral ends (e.g., top or bottom) or from longitudinal sides of the battery cell 100. The negative lid portion can be coupled with a negative portion of the electrolyte 120 and the positive lid portion can be coupled with a positive portion of the electrolyte 120. Thus, by removing or installing the lid 110, an electrical connection can be broken or established with the electrolyte 120 and thus, the lid 110 can be configured to operate as a current interrupter device for the battery cell 100. The lid 110 may include an insulation layer disposed between the positive lid portion and the negative lid portion to electrically isolate the positive lid portion from the negative lid portion.

At ACT 615, the lid 110 can be coupled with the housing 115. The lid 110 can be coupled with the housing 115, for example, to seal the battery cell 100 using a gasket 125 with the gasket 125 including an inner portion 135 having an ingress point 140 and an egress point 145. The gasket 125 can include a gasket, a washer, an O-ring, a cap, a fitting, a hose coupling, or any other component to house, retain, hold, secure, or seal the lid 110 with the first end 220 of the housing 115.

The gasket 125 can be coupled with the lid 110 to secure or hold the lid 110 in place and seal the battery cell 100. The seal can be hermetic or sufficient to prevent leakage of the electrolyte 110. The seal formed by the gasket 125 can include any type of mechanical seal, such as a hermetic seal, an induction seal, a hydrostatic seal, a hydrodynamic seal, and a bonded seal, among others. The gasket 125 can include electrically insulating material to electrically isolate portions of the lid 110 (e.g., negative lid portion, positive lid portion) from the housing 115. The gasket 125 can include thermally conductive material to allow heat to evacuate from the inner region 215.

The gasket 125 can be arranged such that it is coupled with the edge or side portion of the lid 110 to secure the lid 110 to the housing 115. The gasket 125 can be positioned on, adjacent or proximate to (e.g., within 1 mm of) or be at least partially supported by an inner surface of the housing 115. The battery cell 100 may include multiple gaskets 125 disposed to couple the lid 110 with the first end 220 of the housing 115.

The first end 220 of the housing 115 can be crimped, bent or otherwise manipulated to form one or more crimped edges 150. The crimped edges 150 can house, retain, hold, secure, or seal the gasket 125 to the first end 220 of the housing 115. For example, the crimped edges 150 can be formed such that the respective crimped edges bend over (or are crimped over) the gasket 125 to secure the gasket 125 and seal the battery cell 100.

The crimped edges 150 can be formed using a crimping die having a substantially flat surface. The flat surface of the crimping die can be applied to the first end 220 of the housing 115 to crimp the first end 220 such that it folds, pinches, or engages with the gasket 125. The crimped edges 150 can be disposed about at least one side of the gasket 125 to hold the gasket 125 in place, such as but not limited to, hold the gasket 125 in position against a surface (e.g., top surface) of the electrolyte 120 or an insulation layer 200 disposed between the gasket 125 and the electrolyte 120 and seal the battery cell 100. The seal can be hermetic or fluid resistant so that the electrolyte or jelly roll 125 does not leak from its location within the housing 115.

The gasket 125 can include an inner portion 135 in the interior of the gasket 125. For example, the gasket 125 can be formed having an inner portion 135 that includes a tunnel, an opening, passageway, pathway, conduit or cannula that extends through an interior of the gasket 125 from an ingress area or point 140 to an egress area or point 145. The inner portion 135 can be integrally formed within the gasket 125. The gasket 125 and the inner portion 135 may include a polymer material.

The ingress point 140 can be disposed within the battery cell 100 (e.g., between the lid 110 and the electrolyte 120 and enclosed in the battery cell 100). The egress point 145 can be exposed, outside, or external to the battery cell 100 (e.g., between an outer or top surface of the lid 110 and a crimped portion 150 of the housing 115). The crimped portion 150 can assist in holding the gasket 125 in place. The crimped portion 150 can also operate as a negative terminal, for example with the lid 110 operating as the positive terminal. The ingress point 140 and the egress point 145 can be sealed with at least one thermocouple wire 130 disposed in the inner portion 135. The seals can be fluid tight or hermetic, for example. In addition to the thermocouple wire 130, the inner portion 135 can include insulating, sealing, or potting material to electrically isolate the thermocouple wire 130 from the gasket 125 or to maintain at least a segment of the thermocouple wire 130 in a fixed position within the tunnel 135.

At ACT 620, a thermocouple wire 130 can be disposed. The thermocouple wire 130 can be disposed within the inner portion 215 such that the thermocouple wire 130 extends through the inner portion 125, past the ingress point 140 and past the egress point 145. The thermocouple wire can include a first lead 165 having a first length, a second lead 165 having a second length, and a third lead 165 having a third length with the second length greater than the first length and the third length greater than the second length.

The thermocouple wire 130 may include a single lead 165 or multiple leads 165. For example, the thermocouple wire 130 can include one or more leads 165 that extend past the egress point 145 and the past the ingress point 140 of the gasket 125. The thermocouple wire 130 can couple one or more thermocouple sensors 105 with a thermocouple device that can include a data processing system to obtain and interpret sensed temperature information from the thermocouple sensor 105, and that can output a temperature reading, for example. Therefore, the thermocouple wire 130 can include one or more leads 165 that extend past the egress point 145 to couple with the respective thermocouple device.

The thermocouple wire 130 can include one or more leads 165 that extend into the inner region 215 of the housing 115. The length of one or more of the leads 165 that extend into the inner region 215 can be selected based in part on the thermocouple sensor 105 the respective lead 165 is to be coupled with and the location of the thermocouple sensor 105 within the inner region 215. For example, a first lead 165 can extend at a first distance from an exit point 160 of the common jacket 155 and disposed a first predetermined spacing (e.g., distance, gap) from a first portion 180 of the electrolyte 120. A second lead 165 can extend at a second distance from the exit point 160 of the common jacket 155 and disposed a second predetermined spacing (e.g., distance, gap) from a second portion 185 of the electrolyte 120. A third lead 165 can extend at a third distance from the exit point 160 of the common jacket 155 and disposed a third predetermined spacing (e.g., distance, gap) from a third portion 190 of the electrolyte 120. The second distance can be different from the first distance and the third distance can be different form the first distance and the second distance. The second predetermined spacing can be different from the first predetermined spacing and the third predetermined spacing can be different from the second predetermined spacing and the first predetermined spacing.

At ACT 625, leads can be disposed within a jacket. For example, each of the first lead 165, the second lead 165 and the third lead 165 can be disposed within a common jacket 155 between the ingress point 140 and the egress point 145 of the gasket 125. There can be three (or other number of) thermocouple wires 130 within the inner region 215 of the housing 115, which can be separate wires or segments of a common wire, and referred to herein as leads 165. The leads 165 of the thermocouple wire 130 can be merged together in a common jacket 155 (e.g., in a common or communal wire jacket or insulator) for passage through an inner portion 135 of the gasket 125. For example, the leads 165 can be disposed within the common jacket and include an insulation material disposed around or between each of the multiple leads 165. The common jacket 155 (or outer sheath) may include an insulating material, a plastic material, thermoplastic material, a rubber material, a Polyvinyl chloride (PVC) material, or other material to protect the thermocouple wire 130 or leads 165 from mechanical, moisture or chemical issues.

At ACT 630, a thermocouple sensor 105 can be disposed. The thermocouple sensor 105 can be disposed in the inner region 215. The battery cell 100 can include one or more thermocouple sensors 105 disposed at different locations within the inner region 215 of the housing 115. For example, the thermocouple sensors 105 can be evenly or symmetrically spaced along a length of the electrolyte 120. The thermocouple sensors 105 can also be disposed asymmetrically within the electrolyte 120 or clustered at an area of the electrolyte 120 that is determined or likely to be hottest the area of the battery cell 100.

The thermocouple sensors 105 can arranged within the inner region 215 such that they are in contact with at least one electrolyte 120, adjacent, or proximate to (e.g., within 2 mm of) at least one electrolyte 120. The battery cell 100 can include two (or other number of) electrolytes 120 or one electrolyte 120 having separate portions (e.g., to provide positive and negative charges). The battery cell 100 can include at least one thermocouple sensor 105 for each portion of the electrolyte 120. For example, for a battery cell having a length of about 65 mm to about 75 mm, the thermocouple wires 130 (or each segment thereof) can have a length of about 100 mm or less from the egress point 145 to the thermocouple sensor 105. The thermocouple wires 130 (or the thermocouple sensors 105) can be disposed between the housing 115 and the electrolyte 120 (e.g. adjacent or within 2 mm of an inner surface of the housing 115), or can be disposed surrounded by the electrolyte 120 (e.g., in the interior of the area defined by the housing as in the example of FIG. 1).

At ACT 635, the thermocouple sensor 130 can be coupled with the leads. One or more thermocouple sensors 130 can be coupled with the first lead 165, the second lead 165 and the third lead 165 of the thermocouple wire 130 to provide sensed temperature information through the thermocouple wire 130.

For example, a first lead 165 can couple with a first thermocouple sensor 105 with the first thermocouple sensor 105 disposed proximate to, adjacent to the first portion 180 of the electrolyte 120. A second lead 165 can couple with a second thermocouple sensor 105 with the second thermocouple sensor 105 disposed proximate to, adjacent to the second portion 185 of the electrolyte 120. A third lead 165 can couple with a third thermocouple sensor 105 with the third thermocouple sensor 105 disposed proximate to, adjacent to the third portion 190 of the electrolyte 120. The first thermocouple sensor 105 can be spaced a first distance 195 from the electrolyte 120. The second thermocouple sensor 105 can be spaced a second distance 197 from the electrolyte 120. The third thermocouple sensor 105 can be spaced a third distance 199 from the electrolyte 120. The first distance 195 can be different from the second distance 197 and the third distance 199 and the second distance 197 can be different from the third distance 199. For example, the third distance 199 can be greater than the second distance 197, which can be greater than the first distance 195.

The first distance 195, the second distance 197 and the third distance 199 can be the same such that the first, second, and third thermocouple sensors 105 are disposed the same distance from the electrolyte 120 but adjacent to different portion 180, 185, 190 of the electrolyte 120.

The one or more thermocouple sensors 105 can be coupled with at least one thermocouple wire 130 which can be coupled with an device or instrument (e.g., thermocouple device) external to the battery cell 100 to provide the sensed temperature information. The thermocouple device that can include a data processing system to obtain and interpret sensed temperature information from the thermocouple sensor 105, and that can output a temperature reading, for example, corresponding to a temperature within the battery cell 100.

Figure 7:
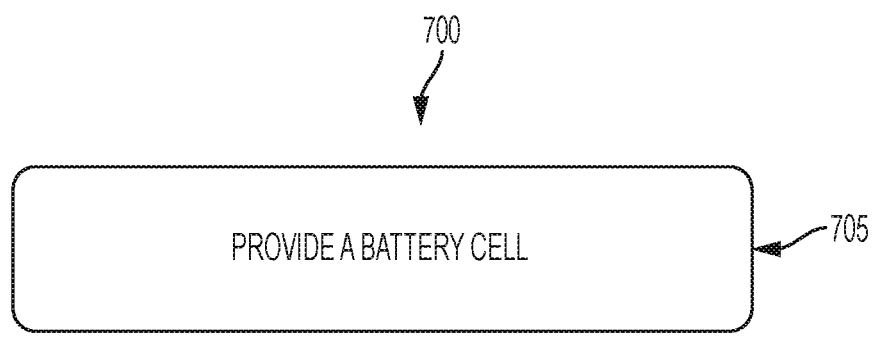
FIG. 7 is a flow diagram depicting a second example method of providing battery cells for battery packs for electric vehicles.

Now referring to FIG. 7, a method 700 for providing a battery cells for battery packs of electric vehicles. The functionalities of the method 700 can be implemented or performed using any of the systems, apparatuses, or battery cells detailed herein. The method 700 includes providing a battery cell. (ACT 705).

At ACT 705, a battery cell 100 is provided. For example, a battery cell 100 of a battery pack 405 to power an electric vehicle 505 can be provided. The battery cell 100 includes a housing 115 defining an inner region 215. An electrolyte 120 can be disposed within the inner region 215. The battery cell 100 can include a lid 110. A gasket 125 can couple the lid 110 with the housing 115 to seal the battery cell 100. The gasket 125 can include an inner portion 135 having an ingress point 140 and an egress point 145. The inner portion 135 can have disposed therein a thermocouple wire 130 that extends through the inner portion 215, past the ingress point 140 and past the egress point 145. The thermocouple wire 130 can include a first lead 165 having a first length, a second lead 165 having a second length, and a third lead 165 having a third length. The second length can be greater than the first length and the third length can be greater than the second length. Each of the first lead 165, the second lead 165 and the third lead 165 can be disposed within a common jacket 155 between the ingress point 140 and the egress point 155 of the gasket 125.

A thermocouple sensor 105 can be disposed in the inner region 215. The thermocouple sensor 105 can be coupled with the first lead 165, the second lead 165 and the third lead 165 of the thermocouple wire 130 to provide sensed temperature information through the thermocouple wire 130.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. Features that are described herein in the context of separate implementations can also be implemented in combination in a single embodiment or implementation. Features that are described in the context of a single implementation can also be implemented in multiple implementations separately or in various sub-combinations. References to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any act or element may include implementations where the act or element is based at least in part on any act or element.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery cell of a battery pack to power an electric vehicle, comprising:
a housing defining an inner region;
an electrolyte disposed within the inner region of the housing;
a lid;
a gasket that couples the lid with the housing to seal the battery cell, the gasket including an inner portion having an ingress point and an egress point, the inner portion having disposed therein a thermocouple wire that extends through the inner portion, past the ingress point and past the egress point;
the thermocouple wire including a first lead having a first length, a second lead having a second length, and a third lead having a third length, the second length greater than the first length, the third length greater than the second length, and each of the first lead, the second lead and the third lead disposed within a common jacket between the ingress point and the egress point of the gasket; and
a thermocouple sensor disposed in the inner region, the thermocouple sensor coupled with the first lead, the second lead and the third lead of the thermocouple wire to provide sensed temperature information through the thermocouple wire.

2. The battery cell of claim 1, comprising:
each of the first lead, the second lead and the third lead coupled with at least one of a plurality of thermocouple sensors; and
each of the first lead, the second lead and the third lead disposed in the inner region and spaced a predetermined distance from the electrolyte.

3. The battery cell of claim 1, comprising:
the first lead extending at a first distance from an exit point of the common jacket and disposed a first predetermined spacing from a first portion of the electrolyte;
the second lead extending at a second distance from the exit point of the common jacket and disposed a second predetermined spacing from a second portion of the electrolyte; and
the third lead extending at a third distance from the exit point of the common jacket and disposed a third predetermined spacing from a third portion of the electrolyte, the second distance different from the first distance and the third distance different from the second distance and the first distance, the second portion different from the first portion and the third portion different from the second portion and the first portion.

4. The battery cell of claim 1, comprising:
the first lead coupled with a first thermocouple sensor, the first thermocouple sensor disposed adjacent to a first portion of the electrolyte;
the second lead coupled with a second thermocouple sensor, the second thermocouple sensor disposed adjacent to a second portion of the electrolyte; and
the third lead coupled with a third thermocouple sensor, the third thermocouple sensor disposed adjacent to a third portion of the electrolyte, the second portion different from the first portion and the third portion different from the second portion and the first portion, and the second thermocouple sensor spaced a first distance from the first thermocouple sensor, the third thermocouple sensor spaced a second distance from the second thermocouple sensor, the second distance different than the first distance.

5. The battery cell of claim 1, comprising:
the common jacket embedded within the gasket such that a portion of the common jacket is integrally formed with the inner portion of the gasket.

6. The battery cell of claim 1, comprising:
the gasket includes an outer surface and the inner region, the outer surface and the inner region comprising a polymer material and the common jacket is embedded within the polymer material.

7. The battery cell of claim 1, comprising:
a plurality of electrolytes disposed within the inner region defined by the housing; and
each of the first lead, the second lead and the third lead disposed in a center region formed between each of the plurality of the electrolytes, each of the first lead, the second lead and the third lead spaced a predetermined distance from each of the plurality of electrolytes.

8. The battery cell of claim 1, comprising:
a first gasket that couples a first edge of the lid to the housing;
a second gasket that couples a second edge of the lid to the housing,
the first and second gaskets configured to position the lid proximate to a first surface of the electrolyte and at a predetermined distance from the electrolyte, and at least one of the first gasket or the second gasket includes the inner region having the thermocouple wire that includes the first lead, the second lead, and the third lead disposed therein.

9. The battery cell of claim 1, comprising:
a first insulation layer disposed between the first lead, the second lead, and the third lead and the electrolyte, and a second insulation layer disposed between the thermocouple sensor and the electrolyte.

10. The battery cell of claim 1, comprising:
the battery cell disposed in a battery module having multiple battery cells, wherein the battery cell is the only cell in the battery module to include the thermocouple wire.

11. The battery cell of claim 1, comprising:
the battery cell disposed in a battery module having multiple battery cells, wherein one or more of the multiple battery cells include thermocouple wires.

12. The battery cell of claim 1, comprising:
the battery cell disposed in a battery module having multiple battery cells, wherein each of the multiple battery cells include thermocouple wires.

13. The battery cell of claim 1, comprising:
the battery cell disposed in a battery module and the battery module disposed in an electric vehicle.

14. A method of providing battery cells for battery packs of electric vehicles, comprising:
providing a housing defining an inner region that houses an electrolyte;
providing a lid;
coupling the lid with the housing to seal the battery cell using a gasket, the gasket including an inner portion having an ingress point and an egress point, disposing a thermocouple wire within the inner portion such that the thermocouple wire extends through the inner portion, past the ingress point and past the egress point, the thermocouple wire including a first lead having a first length, a second lead having a second length, and a third lead having a third length, the second length greater than the first length, the third length greater than the second length;

disposing each of the first lead, the second lead and the third lead within a common jacket between the ingress point and the egress point of the gasket;

disposing a thermocouple sensor in the inner region; and coupling the thermocouple sensor with the first lead, the second lead and the third lead of the thermocouple wire to provide sensed temperature information through the thermocouple wire.

15. The method of claim 14, comprising:

disposing the first lead within the inner region such that the first lead extends at a first distance from an exit point of the common jacket and is positioned a first predetermined distance from a first portion of the electrolyte;

disposing the second lead within the inner region such that the second lead extends at a second distance from the exit point of the common jacket and is positioned a second predetermined distance from a second portion of the electrolyte; and disposing the third lead within the inner region such that the second lead extends at a third distance from the exit point of the common jacket and is positioned a third predetermined distance from a third portion of the electrolyte, the second distance different from the first distance and the third distance different from the second distance and the first distance, the second portion different from the first portion and the third portion different from the second portion and the first portion.

16. The method of claim 14, comprising:

coupling the first lead with a first thermocouple sensor such that the first thermocouple sensor is disposed adjacent to a first portion of the electrolyte;

coupling the second lead with a second thermocouple sensor such that the second thermocouple sensor is disposed adjacent to a second portion of the electrolyte; and coupling the third lead with a third thermocouple sensor such that the third thermocouple sensor is disposed adjacent to a third portion of the electrolyte, the second portion different from the first portion and the third portion different from the second portion and the first portion, and the second thermocouple sensor spaced a first distance from the first thermocouple sensor, the third thermocouple sensor spaced a second distance from the second thermocouple sensor, the second distance different than the first distance.

17. The method of claim 14, comprising:

providing the battery cell in a battery module having multiple battery cells, wherein one or more of the multiple battery cells include thermocouple wires.

18. The method of claim 14, comprising:

providing the battery cell in a battery module; and providing the battery module in an electric vehicle.

19. The method of claim 14, comprising embedding the common jacket within the gasket such that a portion of the common jacket is integrally formed with the inner portion of the gasket.

20. A method, comprising:

providing a battery cell of a battery pack to power an electric vehicle, the battery cell comprising:

a housing defining an inner region;

an electrolyte disposed within the inner region;

a lid;

a gasket that couples the lid with the housing to seal the battery cell, the gasket including an inner portion having an ingress point and an egress point, the inner portion having disposed therein a thermocouple wire that extends through the inner portion, past the ingress point and past the egress point;

the thermocouple wire includes a first lead having a first length, a second lead having a second length, and a third lead having a third length, the second length greater than the first length, the third length greater than the second length, and each of the first lead, the second lead and the third lead disposed within a common jacket between the ingress point and the egress point of the gasket; and a thermocouple sensor disposed in the inner region, the thermocouple sensor coupled with the first lead, the second lead and the third lead of the thermocouple wire to provide sensed temperature information through the thermocouple wire.

* * * * *